(12) United States Patent
Richter

(10) Patent No.: US 8,919,080 B2
(45) Date of Patent: Dec. 30, 2014

(54) MACHINE AND METHOD FOR PACKAGING AND HIGH-PRESSURE TREATMENT OF PRODUCTS

(75) Inventor: Tobias Richter, Memmingen (DE)

(73) Assignee: Multivac Sepp Haggenmueller GmbH & Co. KG (DE)

( * ) Notice: Subject to any disclaimer, the term of this patent is extended or adjusted under 35 U.S.C. 154(b) by 0 days.

(21) Appl. No.: 12/884,812

(22) Filed: Sep. 17, 2010

(65) Prior Publication Data

US 2011/0067355 A1 Mar. 24, 2011

(30) Foreign Application Priority Data

Sep. 18, 2009 (DE) .......................... 10 2009 042 083

(51) Int. Cl.
| | | |
|---|---|---|
| *B65B 55/00* | (2006.01) | |
| *A23L 3/00* | (2006.01) | |
| *A23L 3/015* | (2006.01) | |
| *B65B 31/02* | (2006.01) | |

(52) U.S. Cl.
CPC ................ *B65B 55/00* (2013.01); *A23L 3/003* (2013.01); *A23L 3/0155* (2013.01); *B65B 31/02* (2013.01)
USPC ............................................ 53/425; 53/167

(58) Field of Classification Search
CPC ....... A23L 3/015; A23L 3/0155; B65B 55/00; B65B 55/02; B65B 55/025; B65B 55/027; B65B 55/18
USPC ......... 53/425, 432, 440, 111 R, 510, 127, 79, 53/84, 110, 167
See application file for complete search history.

(56) References Cited

U.S. PATENT DOCUMENTS

| | | | |
|---|---|---|---|
| 5,059,392 A | | 10/1991 | Wijts |
| 5,071,667 A | * | 12/1991 | Grune et al. .................. 426/396 |
| 5,288,462 A | | 2/1994 | Carter et al. |
| 5,316,745 A | * | 5/1994 | Ting et al. .................... 422/295 |
| 5,436,432 A | * | 7/1995 | Cyr ............................... 219/700 |
| 5,593,714 A | * | 1/1997 | Hirsch ......................... 426/268 |
| 5,622,678 A | | 4/1997 | Hiltawsky et al. |
| 5,693,350 A | | 12/1997 | Fernandez et al. |
| 5,932,272 A | | 8/1999 | Raemy et al. |

(Continued)

FOREIGN PATENT DOCUMENTS

| | | |
|---|---|---|
| AT | 365 150 B | 12/1981 |
| CN | 1317939 A | 10/2001 |

(Continued)

OTHER PUBLICATIONS

German Office Action Dated Jun. 22, 2010, Applicant Multivac Sepp Haggenmueller GmbH & Co. KG, Application No. 10 2009 042 083.5-27, 4 Pages.

(Continued)

*Primary Examiner* — Stephen F Gerrity
(74) *Attorney, Agent, or Firm* — Brooks Kushman P.C.

(57) ABSTRACT

The disclosure relates to a packaging machine for packaging products, in particular food, wherein the packaging machine comprises at least one packaging station for producing packagings that accommodate products, and at least one high-pressure treatment station for high-pressure treatment of the products contained in the packagings. The disclosure is characterized in that a central control system for the packaging station and the high-pressure treatment station are provided. The disclosure moreover also relates to a method for operating such a packaging machine.

24 Claims, 6 Drawing Sheets

(56) References Cited

U.S. PATENT DOCUMENTS

| | | | |
|---|---|---|---|
| 6,017,572 A | 1/2000 | Meyer | |
| 6,117,460 A | 9/2000 | Kortschack | |
| 6,185,913 B1 * | 2/2001 | Cappi et al. | 53/511 |
| 6,193,051 B1 | 2/2001 | Focke | |
| 7,331,161 B2 * | 2/2008 | Buchko | 53/432 |
| 7,628,001 B2 * | 12/2009 | Lonneborg | 53/425 |
| 7,722,912 B2 | 5/2010 | Hotek et al. | |
| 8,046,979 B2 | 11/2011 | Ruzic et al. | |
| 8,327,606 B2 | 12/2012 | Kemp et al. | |
| 2003/0161917 A1 * | 8/2003 | Voisin | 426/410 |
| 2004/0033296 A1 * | 2/2004 | Yuan et al. | 426/326 |
| 2006/0024414 A1 * | 2/2006 | Turek et al. | 426/335 |
| 2006/0153962 A1 * | 7/2006 | Carroll et al. | 426/583 |
| 2006/0257552 A1 | 11/2006 | Hotek et al. | |
| 2007/0237865 A1 * | 10/2007 | Love et al. | 426/129 |
| 2008/0145488 A1 * | 6/2008 | Van Diepenbeek et al. | 426/106 |
| 2008/0152767 A1 * | 6/2008 | Maisel | 426/118 |
| 2008/0260916 A1 | 10/2008 | Kortschack | |
| 2009/0217626 A1 * | 9/2009 | Kemp et al. | 53/407 |
| 2009/0238937 A1 * | 9/2009 | Yamazaki et al. | 426/407 |
| 2010/0009042 A1 * | 1/2010 | Fujikawa et al. | 426/112 |
| 2010/0077701 A1 | 4/2010 | Ehmer | |
| 2010/0205903 A1 * | 8/2010 | Py | 53/167 |
| 2011/0027438 A1 * | 2/2011 | Finkowski et al. | 426/413 |

FOREIGN PATENT DOCUMENTS

| | | |
|---|---|---|
| CN | 101312883 A | 11/2008 |
| DE | 196536 | 3/1908 |
| DE | 822 193 C | 11/1951 |
| DE | 7023578 | 6/1970 |
| DE | 26 11 389 A1 | 9/1976 |
| DE | 42 26 255 A1 | 2/1994 |
| DE | 37 34 025 C2 | 11/1994 |
| DE | 196 53 677 C1 | 9/1997 |
| DE | 196 35 598 A1 | 3/1998 |
| DE | 196 49 952 A1 | 6/1998 |
| DE | 197 38 800 A1 | 3/1999 |
| DE | 199 39 677 A1 | 2/2001 |
| DE | 199 52 611 A1 | 5/2001 |
| DE | 101 01 958 A1 | 7/2002 |
| DE | 10 2005 011 868 A1 | 9/2006 |
| DE | 10 2007 015 754 B3 | 5/2008 |
| DE | 10 2007 015 754 B3 | 9/2010 |
| DE | 198 01 031 A1 | 9/2010 |
| EP | 018540 A1 | 5/1986 |
| EP | 0 588 010 A1 | 3/1994 |
| EP | 0 683 986 B1 | 11/1995 |
| EP | 0 687 421 A1 | 12/1995 |
| EP | 0 689 391 B1 | 1/1996 |
| EP | 0 748 592 B1 | 12/1996 |
| EP | 1 100 340 B1 | 5/2001 |
| EP | 1 112 008 B1 | 7/2001 |
| EP | 0 752 211 B1 | 10/2001 |
| EP | 1 201 252 B1 | 5/2002 |
| EP | 1 327 392 A1 | 7/2003 |
| WO | 99/38394 A2 | 8/1999 |
| WO | 9938394 A2 | 8/1999 |
| WO | 2004/000451 A2 | 12/2003 |
| WO | 2006/097248 A1 | 9/2006 |
| WO | 2006/129180 A1 | 12/2006 |
| WO | 2007128281 A1 | 11/2007 |
| WO | 2008/108120 A1 | 9/2008 |

OTHER PUBLICATIONS

German Office Action Dated Mar. 9, 2010, Applicant Multivac Sepp Haggenmueller GmbH & Co. KG, Application No. 10 2009 042 094.0-27. 3 Pages.

German Office Action Dated Jun. 18, 2010, Application No. 10 2009 042 088.6-41, Applicant Multivac Sepp Haggenmueller GmbH & Co. KG, 5 Pages.

Chinese Notification of First Office Action Dated Dec. 30, 2013, Application No. 201110065413.4, Applicant Multivac Sepp Haggenmueller GmbH & Co. KG, 11 Pages.

Extended European Search Report, Dated Dec. 4, 2012, Application No. 10008108.2-2308 / 2308759, Applicant Multivac Sepp Haggenmueller GmbH & Co. KG, 6 Pages.

* cited by examiner

MACHINE AND METHOD FOR PACKAGING AND HIGH-PRESSURE TREATMENT OF PRODUCTS

CROSS-REFERENCE TO RELATED APPLICATIONS

This application claims foreign priority benefits under 35 U.S.C. §119(a)-(d) to German patent application number DE 102009042083.5, filed Sep. 18, 2009, which is incorporated by reference in its entirety.

TECHNICAL FIELD

The present disclosure relates to a packaging machine and a corresponding method by means of which products, in particular food, are packaged and subsequently treated under high pressure.

BACKGROUND

Food is subject to chemical and biological processes which modify its composition and can also produce substances that are detrimental to health. For example, food can oxidize, or it can be modified by enzymes and microorganisms, for example mould fungi. For food to be safely consumed by the consumer, and to be transportable and nonperishable as long as possible, these processes must be prevented or at least sufficiently delayed within the desired storage life.

One possibility is to extremely sugar, salt or dry the food to remove water from the food and to thus hinder the development of microorganisms, such as mould fungi or bacteria. The addition of alcohol or vinegar, the addition of preservatives as well as cooling slow down the development of microorganisms and reduce the activity of enzymes. Furthermore, heat treatment can make sure that microorganisms are killed and harmful enzymes inactivated. In pasteurization, the food is heated to below 100° C. for a certain period. However, the comparably resistant bacteria spores still remain germinable, and there is a risk in that important nutrients and flavors are also destroyed by the heat treatment.

Another method of extending the storage life of food is to fill the food into a gastight packaging and to evacuate the packaging before sealing it. Optionally, a protective gas or mixtures can be added to the packaging, for example nitrogen or $CO_2$. By the displacement of air, for example oxygen, the activity of enzymes or microorganisms is also slowed down.

A method that has been hardly used at least on an industrial scale is the (ultra)high-pressure treatment of food. In this method, usually already packaged food is subjected to very high pressures of typically 400 MPa to 600 MPa for a certain period, for example some minutes. These high pressures make sure that harmful microorganisms in food are destroyed and killed. Smaller molecules, however, such as vitamins, which determine the taste and nutritional value of the food, are hardly affected by the high-pressure treatment. In meat products, the storage life can thus be extended, for example, by a factor of 6 to 10, compared to an untreated product.

Compared to heat treatment, high-pressure treatment has various advantages. For example, the taste is hardly changed, and the vitamin content in the food is sometimes more than twice as high after high-pressure treatment than after heat treatment. Moreover, some heat-sensitive products, for example seafood, cannot be heat-treated at all. Pathogenic germs, such as listeria, can be reliably killed, so that food safety is increased. Moreover, the internal structure of food can also be selectively influenced by high-pressure treatment, resulting in novel product possibilities, for example by gelling fruit preparations without heat. Finally, the technology for high-pressure treatment is already recognized in many countries as (food) safe. Moreover, high-pressure treatment permits a longer storage life of food while simultaneously no food preservatives are used. High-pressure treated food does not have to be permanently cooled, it can rather be stored at temperatures higher than 4 to 6° C. At the same time, the high sensory and nutritional values (such as the vitamin content) of the products or food are maintained.

In the high-pressure treatment of packaged food, problems with the packaging can arise due to the process conditions. For example, optically disadvantageous changes and even damages can occur. Especially packaging with a protective atmosphere cause problems due to the highly compressible gas proportion in the packaging. This is also a reason why up to now mainly vacuum packagings are employed in high-pressure treatment.

The inactivation of microorganisms as well as the structural modification of food components are described, for example, in EP 0 588 010 A1, EP 0 689 391 B1, EP 0 752 211 B1, EP 1 100 340 B1, DE 42 26 255 A1, or DE 37 34 025 C2, EP 1 112 008 B1, EP 1 201 252 B1, DE 196 49 952 A1, DE 197 38 800 A1, DE 199 39 677 A1, and DE 26 11 389 A1 describe the effects of high-pressure treatments on microbiological storage life and the safety of food. The application of high-pressure treatment especially for meat products is described in DE 198 01 031 C2, DE 196 53 677 C1, EP 0 748 592 B1, EP 0 683 986 B1, DE 101 01 958 A1, DE 10 2005 011 868 A1, or WO 2006/097248 A1.

A system for high-pressure treatment of food is moreover known from WO 2006/129180 A1. There, an autoclave with a high-pressure chamber is provided in which the food is subjected to high pressure. For building up the pressure, the autoclave must be sealed. Consequently, the system cannot be operated continuously. To increase the throughput of the system, it is typically operated in a batch mode where the products are introduced into the autoclave in groups, treated with high pressure and removed.

Another system for the high-pressure treatment of products can be taken from EP 0 687 421 A1. In this system, a high-pressure chamber and a low-pressure chamber are provided.

A high-pressure system which can treat industrially common quantities does not yet exist. Only many/several parallel autoclaves which are normally also loaded manually could master the output.

SUMMARY

It is an object of the present disclosure to provide a packaging machine and a method which permit the inexpensive employment of high-pressure treatment even on an industrial scale.

The packaging machine according to the disclosure is characterized in that a central control system for the packaging station and the high-pressure treatment station is provided. Up to now, packaging stations and high-pressure treatment stations have always been separate machines. The central control system in accordance with the disclosure now permits to coordinate the operation of these stations and the respective throughput to avoid waiting times of the stations. In particular, the central control system can ensure a smooth, possibly synchronized operation of the stations to thus increase the total throughput of the packaging machine. The produced and treated products can thus become less expensive if waiting times are avoided, in particular in the cost-intensive high-pressure treatment station.

The packaging machine according to the disclosure can comprise several packaging stations and one single high-pressure treatment station. This additionally makes sure that the normally cost-intensive high-pressure treatment station can be operated continuously to further reduce the costs of the packaged and high-pressure treated products. Moreover, this facilitates the production of different packages in the packaging machine.

In the high-pressure treatment, the packaging takes care that a direct contact between the product to be treated and the high-pressure medium (which is usually water) is avoided. Moreover, it is thus ensured that the products are not recontaminated after the treatment. Even in clean room filling, there will always be the risk of recontamination with certain germs that are present everywhere, such as listeria. This risk increases if operators must be employed.

By controlling the at least one packaging station together with the high-pressure treatment station, a linked, all-automatic operation of the complete packaging machine is possible, permitting a clearly higher throughput compared to separately operated machines. The packaging station can be, for example, a deep-drawing packaging station, a (chamber) conveyor belt machine or a tray sealer. It is even possible for the packages to be evacuated and/or provided with a protective gas or protective gas mixture (for example nitrogen or $CO_2$) before they are closed and sealed. In addition to the high-pressure treatment, the protective gas prevents an increase of possibly still existing germs and an oxidation of the products. In particular in food industry, by the combination of high-pressure treatment and protective gas treatment of the products, the storage life of these products can be considerably extended.

Preferably, at least one transport container is provided for accommodating products during the high-pressure treatment of these products. The transport container combines a plurality of products in one group which are subjected to the high pressure together, i.e. in a so-called "batch mode". This mode of operation offers itself as the high-pressure chamber of the high-pressure treatment station must be pressure sealed. The transport container facilitates the transport of the products and increases the speed during the loading and unloading of the high-pressure chamber.

It is advantageous for the transport container to comprise a lower part and an upper part which can be connected to each other, the lower part as well as the upper part being embodied to accommodate at least one product. This offers advantages over conventional, one-piece transport containers with respect to a higher filling degree and facilitated loading and unloading of the transport containers, mainly in case of automated loading with a robot.

The high-pressure treatment system preferably comprises a transport means for transporting the transport containers from a loading station to a high-pressure chamber, further to an unloading station and back to the loading station. This transport means can be a group of driven conveyor belts or rolls which can together define an annularly closed transport path.

Loading and unloading of the transport container can be carried out manually. These procedures, however, can be performed faster if a robot or a gripper for automatically loading or unloading the transport container is provided at the loading station and/or at the unloading station. For example, the gripper could comprise suction means to temporarily hold the products or their packages by sucking them up.

In the high-pressure treatment station, several high-pressure chambers can be provided which are nevertheless supplied with a pressurized high-pressure medium by a common pressure generating system. It surprisingly showed that in a suited operation of the high-pressure chambers, for example a time-staggered operation, one single pressure generating system can be sufficient to supply several high-pressure chambers. As the pressure generating system handles several high-pressure chambers, it can be quasi operated under permanent load. In this manner, pressure variations and wear of the pressure generating system are reduced. By supplying several high-pressure chambers with one common pressure generating system, a considerable amount of costs can be saved in the setting up of the high-pressure station as well as in its operation. A further advantage of the disclosure is that even if one high-pressure chamber (here and hereinafter synonymous to the term "autoclave") fails, production can still be continued with the other high-pressure chamber or chambers, i.e. with at least 50% of the original capacity. Still another advantage is that different products in each chamber can possibly be treated in a different way.

In particular, the high-pressure treatment station can comprise exactly two high-pressure chambers. The pressure generating system can comprise one or several high-pressure pumps as well as one or several low pressure pumps.

Preferably, the pressure generating system comprises an actuated pressure distribution system by means of which the pressure can be selectively applied to one of the high-pressure chambers. In this manner, one can exactly control at which curve the pressure is increased, maintained and lowered in the individual high-pressure chambers.

It is appropriate for a pressure to be applied simultaneously to several high-pressure chambers by means of the pressure generating system. Thus, waiting times of the one autoclave are avoided which could otherwise be necessary until the other autoclave is completely relieved from pressure. Instead, this variant of the disclosure does not only permit an alternating, but also a time-staggered and even partially overlapping high-pressure operation of the autoclaves. In this manner, the mean cycle time (i.e. the cycle time of the individual autoclave divided by the number of autoclaves) can be reduced.

For this purpose, it is particularly advantageous if different pressures can be simultaneously applied to two high-pressure chambers by means of the pressure generating system. Thereby, the time-staggered operation of the high-pressure chambers is further favored.

In one variant of the disclosure, the pressure generating system comprises means for maintaining a high pressure in a high-pressure chamber. This means takes care of maintaining the high pressure or maximum pressure in the high-pressure chamber, even if the pressure generating system simultaneously takes care of an increase of the pressure in another high-pressure chamber. Here, the high pressure can be either taken from a central pressure generator of the pressure generating system, or else from a separate high-pressure pump which is connected to the high-pressure chamber during the holding time of the high pressure.

It is conceivable to connect the central control system to a production data acquisition system to collect—for example for maintenance purposes—the performance parameters of the packaging machine or document the quality of the treated products.

The coordination of the operating sequence of the packaging machine, in particular the synchronization of a packaging station and the high-pressure station, can be facilitated by providing a storage area for storing a plurality of products e.g. at the loading station. Thereby, the products can be quasi continuously delivered to this storage area while they are subsequently reloaded in groups from the storage area into a transport container. Thus, on the one hand the packaging station could continuously produce the packages that can be continuously treated in the high-pressure treatment station (possibly depending on the operating data supplied by the high-pressure station). On the other hand, the packaging station can produce packages and submit them to the storage area in such a quantity that the same is always filled. Even if the packaging stations are stopped, for example to equip them with a new foil, this does not lead to a standstill of the cost-intensive high-pressure treatment station. In this case, the storage can continue supplying packagings to the high-pressure treatment station. As a standstill of the high-pressure treatment station is avoided, the efficiency of the packaging machine is further increased.

An inspection system for examining the products and/or their packaging for damages or deficiencies is advisable. The inspection system could perform a weight measurement to detect underweight or empty packagings, a metal detection to detect metallic residues at the products, and/or an optical inspection with respect to deficiencies or damages to the product or packaging, for example faulty labeling. Even damages to the product or the packaging which are possibly caused in the high-pressure treatment can be thus detected.

Sorting-out means can take care of sorting out damaged or defective products or packagings, so that these do not unnecessarily have to be subjected to the time- and cost-intensive high-pressure method. Inspection and sorting out of the products and packagings can be performed before loading the transport container as well as after unloading a transport container.

An all-automatic operation of the packaging machine with a maximum throughput can be facilitated if a maximum number of further components of the system is connected to the central control system, in particular the transport means, the gripper, the inspection system and/or the sorting-out means.

The disclosure also relates to a method for the operation of a packaging machine for packaging products, in particular food, in at least one packaging station, and for a subsequent high-pressure treatment of the packaged products in at least one high-pressure treatment station. The disclosure is characterized by the coordinated actuation of the packaging station(s) and the high-pressure treatment station(s) by means of a common control system. As was already illustrated in detail, this ensures a smooth operation of the packaging machine at a very high throughput, so that products can be packaged and treated with high pressure even on an industrial scale and thus comparably inexpensively.

It is advantageous for already packaged products to be stored in a storage area between the packaging station and the high-pressure treatment station. In this manner, sufficient packagings can always be present to avoid an undesired and cost-intensive standstill of the high-pressure treatment station.

Advantageously, the common control system is designed to adjust the number of packagings produced in the packaging stations per time unit to the number of packagings treated with high pressure in the high-pressure treatment stations per time unit. In an all-automatic operation, the packagings stored in a storage area can also be taken into consideration. In this manner, waiting times of the different components of the packaging machine are altogether largely avoided.

In a special embodiment, the packaging stations and the high-pressure treatment stations can also be operated synchronously with respect to each other by means of the control system.

In one variant of the disclosure, at least two high-pressure chambers are provided which are supplied with a high-pressure medium by a common pressure generating system. The disclosure is then characterized in that the high-pressure chambers are operated in different or time-staggered cycles. This permits a quasi-continuous operation of the pressure generating system with corresponding advantages in view of lower pressure variations, lower maintenance efforts and lower operating costs. The asynchronous or time-staggered operation of the high-pressure chamber moreover leads to a more uniform output of treated products compared to a synchronous operation, so that even the operation of downstream processing means (for example labeling or external packaging devices) is facilitated.

Preferably, the high-pressure chambers are supplied with pressurized high-pressure medium such that always in at most one of the high-pressure chambers, the maximum pressure adjusted for the treatment of the products prevails, and/or that always in at most one of the high-pressure chambers, the pressure is built up to high pressure. In this manner, the required pump performance of the pressure generating system is limited, so that the pressure generating system can be dimensioned to be smaller and less expensive.

In a special variant of the method, in one of the high-pressure chambers, high pressure build-up starts after or exactly when in another high-pressure chamber, high-pressure build-up is completed. In this manner, a uniform, quasi continuous operation of the pressure generating system is further favored. As an alternative, the pressure build-up in the high-pressure chambers could, however, be at least partially performed in parallel.

In one method variant, it is conceivable to perform several pressure cycles in one high-pressure chamber. By the multiple high-pressure treatment of the products contained in the high-pressure chamber, then not only pasteurization, but even sterilization is performed, i.e. a complete killing of the germs and microorganisms. With respect to the synchronization of the high-pressure chambers, it is possible for each of the pressure cycles to correspond to a normal cycle of the high-pressure chamber.

It was already illustrated that before and/or after the high-pressure treatment, an automatic inspection for damages or deficiencies of the products or their packagings is performed. In this manner, an unnecessary high-pressure treatment of defective or damaged products can be in particular avoided.

In the following, advantageous embodiments of the disclosure are illustrated more in detail with reference to a drawing. In detail:

DETAILED DESCRIPTION

Figure 1:
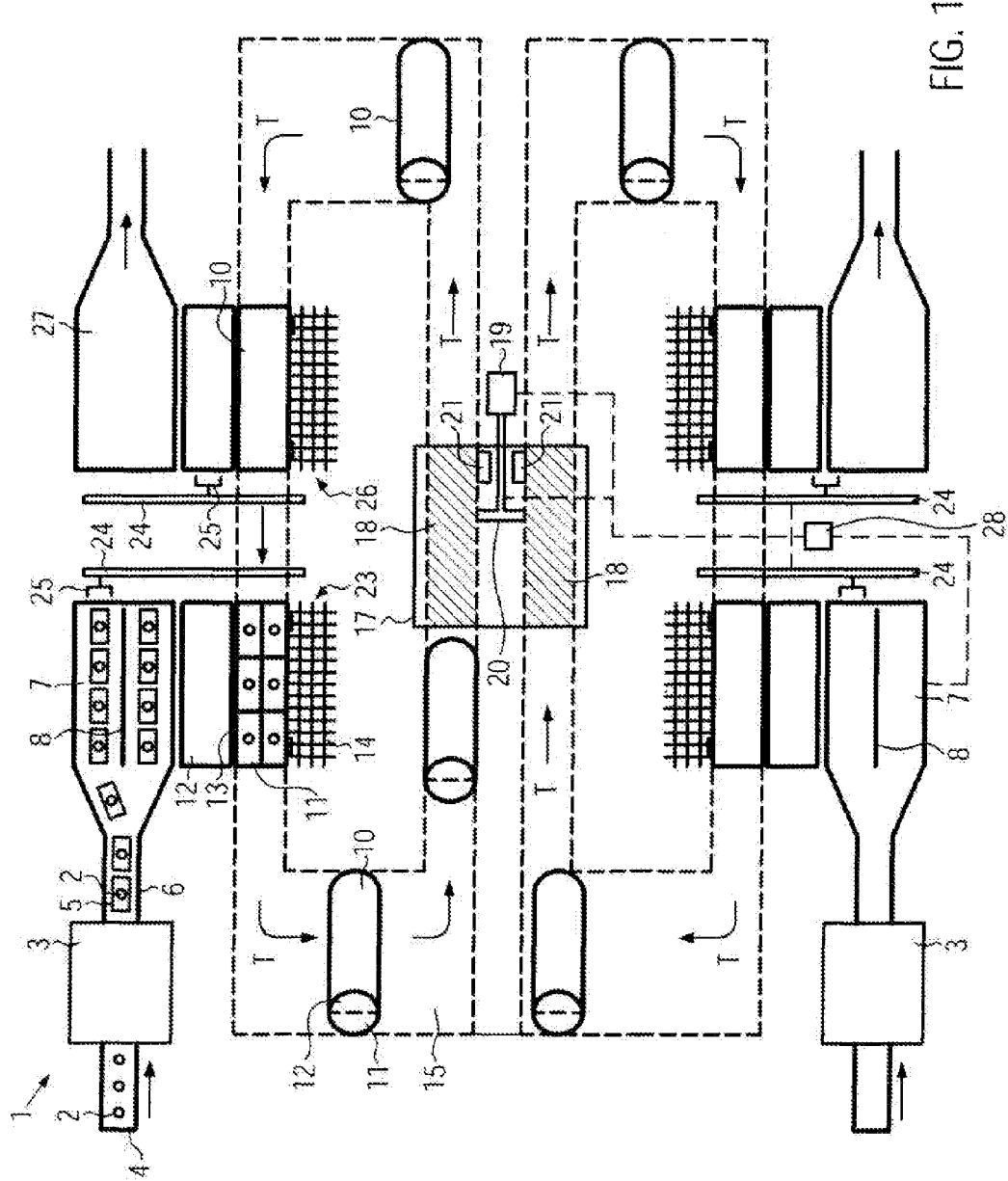
FIG. 1 shows a schematic view of a complete packaging machine.

Equal components are always provided with equal reference numerals in the figures.

FIG. 1 shows, in a schematic overview, a packaging machine according to the disclosure for packaging and high-pressure treatment of products 2. The products 2 can be in particular food of which the storage life is extended by the high-pressure treatment and/or of which the properties, such as viscosity, are selectively positively influenced.

The embodiment of the packaging machine 1 according to the disclosure shown in FIG. 1 comprises two packaging stations 3. The packaging stations 3 can be, for example, deep-drawing packaging stations, (chamber) conveyor belt machines, or so-called "tray sealers". The two packaging stations 3 can be of the same or of different types. A conveyor belt 4 (or any other suited conveyor means) takes up the products 2, for example in already (pre-)shaped lower trays of a packaging, and transports the products 2 into the packaging station 3.

In the packaging station 3, a gastightly closed packaging 5 is formed around each product. Before a packaging 5 is closed, it can be evacuated in the packaging station 3 and swept with a protection or replacement gas, for example nitrogen and/or $CO_2$, which replaces the air in the packaging and extends the storage life of the product 2.

Via another conveyor belt 6, the packaged products 2 are passed from the packaging station 3 to a storage area 7. The storage area 7 is large enough to accommodate a plurality of products 2 or packagings 5, respectively. In the storage area 7, the products 2 or packagings 5, respectively, fed by means of the conveyor belt 6 come to rest. Guide means 8 can be provided in the storage area 7 to orient the packagings 5 in a defined manner and to direct the packagings 5 into different compartments of the storage area 7.

The machine 1 according to the disclosure comprises a plurality of transport containers 10. Each transport container 10 comprises a semicylindrical lower part 11 and an also semicylindrical upper part 12 which are connected one upon the other via a hinge 13 so as to be swiveling. In a closed position, the two parts 11, 12 are put together to form a cylindrical transport container 10. In an opened position, in which the transport container 10 is represented adjacent to the storage area 7 in FIG. 1, the two parts 11, 12 are freely accessible from above. The transport container 10 further comprises a holding element 14 which is connected to one of the two parts 11, 12 via another hinge and which is embodied as a safety grid in the embodiment. Such a holding element 14 can also be provided at the lower part 11 as well as at the upper part 12. It serves to secure the products 2 or packagings 5, respectively, placed in the two parts 11, 12 of the transport container 10 from getting out of place or being shifted while the transport container 11 is being opened or closed, e.g. when the two halves of the transport container 10 are folded up.

By a transport means 15, for example a group of cooperating conveying belts, the transport containers 10 can be each transported along an annularly closed transport path. The direction of transport T is indicated in FIG. 1 with several arrows. Usually, the transport will be accomplished in steps or intermittently, respectively.

The core of the packaging machine 1 according to the disclosure is a high-pressure treatment station 17 embodied as double autoclave which has two gastightly sealable high-pressure chambers 18. The size of each high-pressure chamber 18 approximately corresponds to an integral multiple of the volume of a transport container 10. For example, one high-pressure chamber 18 can accommodate one, two or three transport containers 10 at a time, so that the products 2 accommodated in the transport containers 10 can be subjected to the pressure of a high-pressure medium.

In the embodiment, a common pressure generating system 19 is provided by means of which the pressure of the high-pressure medium is generated and adjusted in both high-pressure chambers 18. The pressure generating system 19 has a plurality of low- and high-pressure pumps for the high-pressure medium. Moreover, a reservoir for the high-pressure medium can be provided.

Via a schematically shown pressure distribution system 20, the high-pressure medium is selectively guided to the two high-pressure chambers 18. Corresponding switching equipment and valves in the pressure distribution system 20 take care of controlling the pressure at the two high-pressure chambers 18. The pressure distribution system 20 is designed such that different pressures can be applied simultaneously to the two high-pressure chambers 18.

The pressure generating system 19 also contains means 21 for maintaining the high pressure in a high-pressure chamber 18. The means 21 can be a separate high-pressure pump 21 which is each allocated to one of the two high-pressure chambers 18. The means 21 serve to compensate pressure losses, e.g. due to thermal fluctuations in one of the high-pressure chambers 18 during the holding time of the maximum pressure, while the pressure distribution system 20 simultaneously takes care of the pressure build-up in the other high-pressure chamber 18.

At a loading area 23 provided adjacent to the storage area 7 along the transport means 15, the opened transport containers 10 can be loaded with products 2. To this end, a gripper 24 is provided which can grip one or simultaneously several packagings 5 and reload them from the storage area 7 into the open transport container 10 by means of a gripping or suction means 25. On the side of the autoclave 17 situated downstream in the direction of transport T, an unloading station 26 is analogously provided in which the opened transport containers 10 are unloaded. A gripper 24 with a gripping or suction means 25 is also provided at the unloading station 26 to remove the products 2 (not represented here) from the opened transport container 10 and reload them to a discharge belt 27.

It makes sense to provide means (e.g. mechanical or pneumatic means) to close or open, respectively, the transport containers 10 and possibly also the holding elements 14 outside the loading and unloading stations 23, 26. In a clock-wise or intermittent operation of the transport means 15, the means for automatically closing the transport container 10 can be provided, for example, at the location which the transport container 10 reaches one cycle later than the loading station 23. The means for automatically open the transport container 20 could be analogously provided at the location along the transport means 15 which the transport container 10 reaches one cycle before the unloading station 23 is reached. If opening and closing of the transport container 10 is not accomplished at the loading and unloading station 23, 26 itself, the cycle time of the packaging machine 1 can be possibly shortened. If enough time is available anyway, however, closing or opening of the container can also be accomplished at the loading station 23 or at the unloading station 26 itself.

To control the packaging machine 1 or its components, a central control system 28 is provided. Via data and control lines 29, the control system 28 is connected to the different components of the high-pressure treatment system 1. FIG. 1 indicates that the control system 28 is connected, among other things, to the packaging stations 3, the pressure generating system 19, the pressure distribution system 20 and the grippers 24 at the loading and unloading station 23, 26. Moreover, the control system 28 is also connected to the transport means 15 and further components of the packaging machine 1 not represented in FIG. 1. In particular, it can be connected to a production data acquisition system (PDA system) to monitor the operation of the packaging machine 1 and assure and check the quality of the results of the high-pressure treatment.

Figure 2:
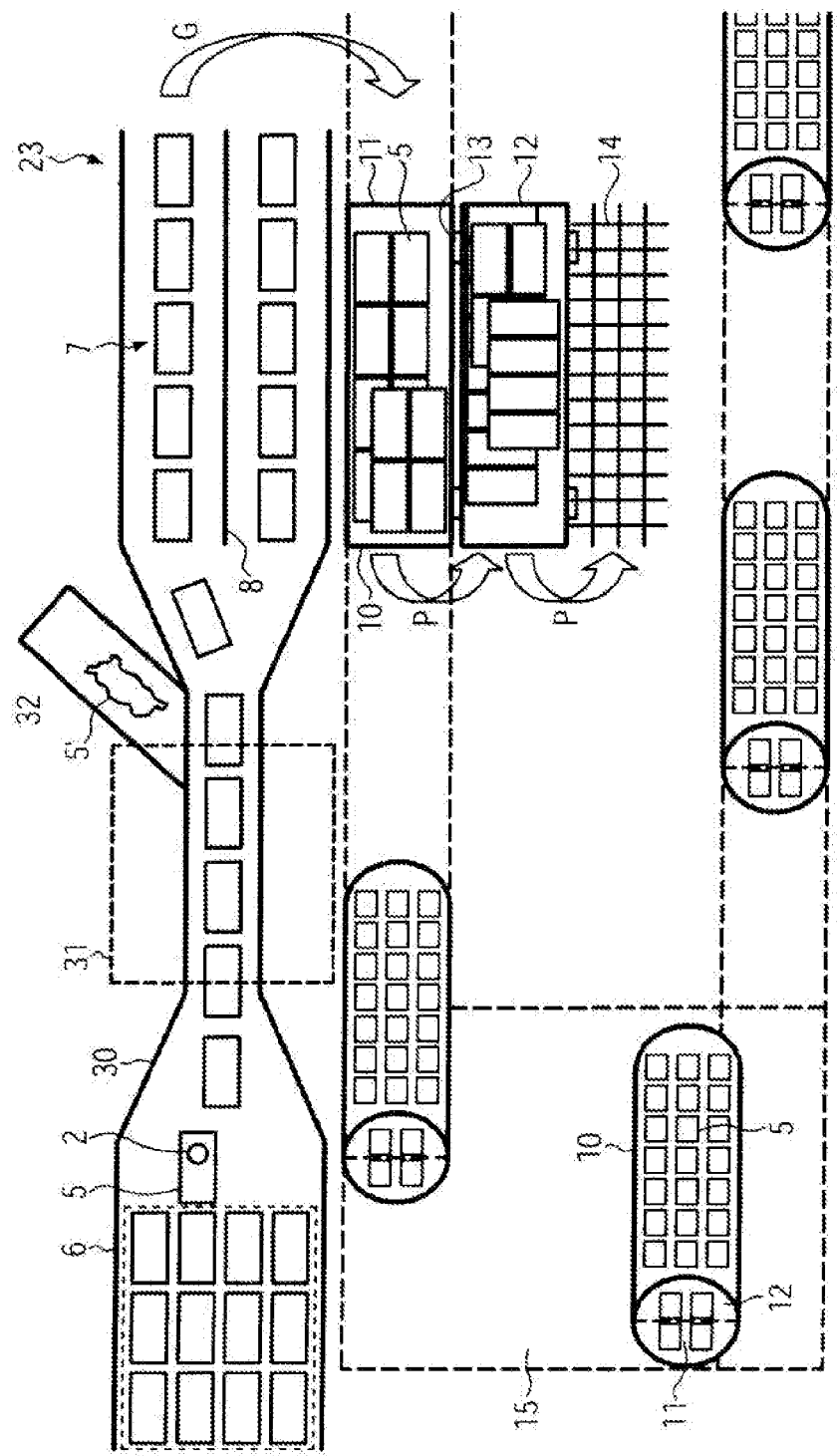
FIG. 2 shows a section of the machine shown in FIG. 1 in the region of the loading station.

FIG. 2 shows an enlarged detail of the packaging machine 1 of FIG. 1 in the area of the loading station 23.

Here, in particular the area between the conveyor belt 6 that follows the packaging station 3 and the storage area 7 are shown in enlargement. On the conveyor belt 6, the packaged products 2 are first transported on multiple tracks as they are also produced on multiple tracks in the upstream packaging station 3. In the embodiment according to FIG. 2, the packagings 5 are transported, for example, on four adjacent tracks. An isolation means 30, for example suitably shaped guide walls, take care of reducing the number of tracks down to an isolation of the packagings 5. In this manner, the packagings 5 can be individually supplied to an inspection system 31. The inspection system 31 has suited sensors to detect the weight of the packagings 5, mainly also empty packagings, metal residues and/or other damages and deficiencies of the product 2 or the packaging 5.

In this manner, damaged or defective packagings 5' can be identified and withdrawn from the processing procedure by means of sorting-out means 32.

The faultless packagings 5, however, reach the storage area 7. There, they are taken up by the gripper 24 and—as indicated by the arrow G—loaded into the opened transport container 10. The two arrows P indicate how the upper part 12 of the transport container 10 has been opened relative to the lower part 11 about the hinge 13, and how the holding element 14 has been opened relative to the upper part 12. One can see in FIG. 2 that the packagings 5 are stacked in the transport container 10 so as to partially overlap.

Figure 3:
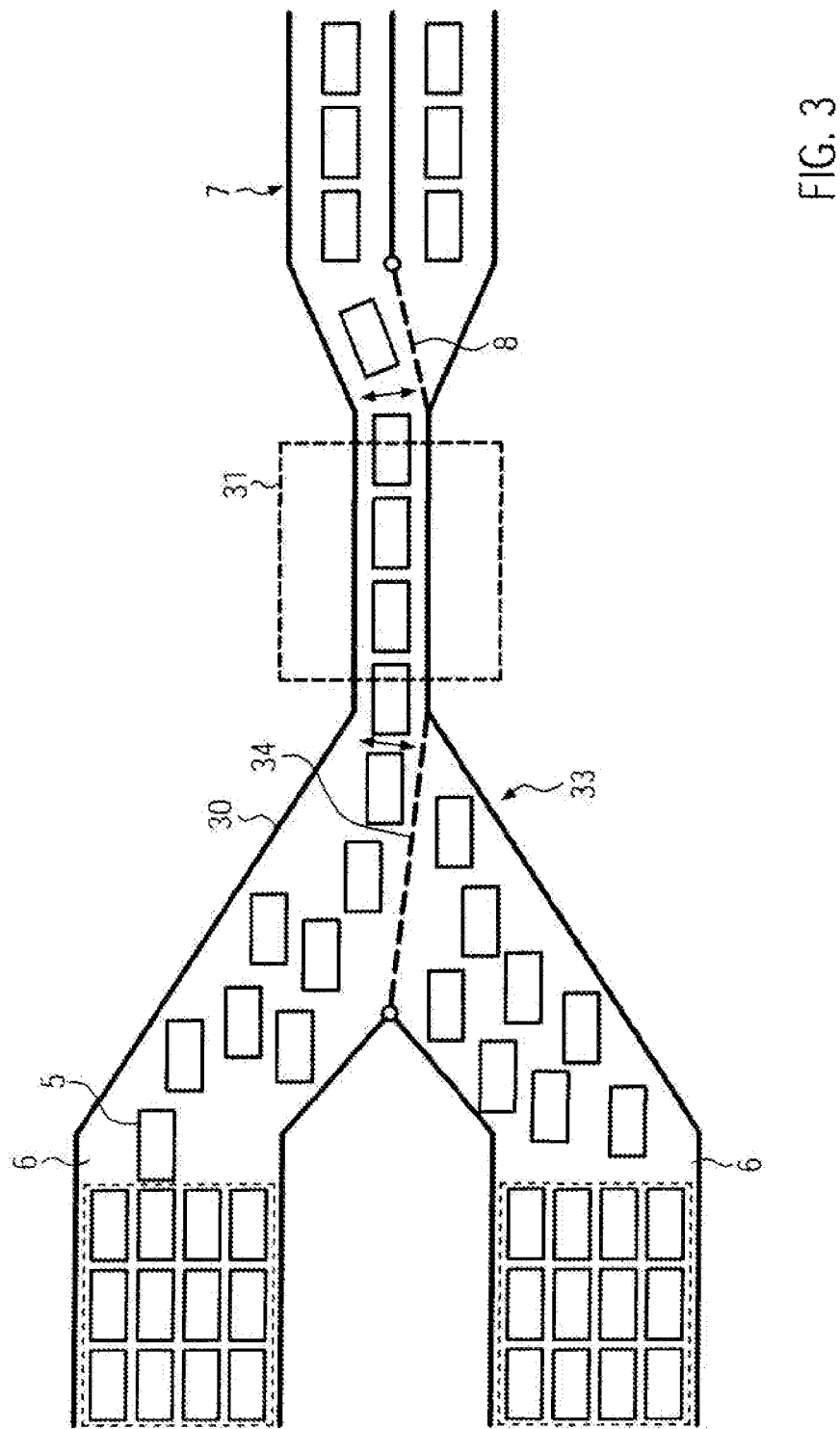
FIG. 3 shows a second embodiment of the packaging machine in which a common transport container loading station is provided for two packaging stations.

FIG. 3 schematically shows a modified form of the isolation means 30 in which products 2 or packagings 5, respectively, are approached from two different belt conveyors 6. Each of the belt conveyors 6 is allocated to one packaging station 3. The packaging stations 3 can be of the same or of different types. In the region of the isolation means 30 according to FIG. 3, there is a distributing guide 33 at which the conveying paths of the two belt conveyors 6 are joined. An actuated shut-off means 34, in this case a swiveling guide means, optionally opens the transport path from one of the two belt conveyors 6 to the isolation means 30, so that the isolated packagings 5 can be fed to the inspection system 31. The variant according to FIG. 3 offers itself if the capacity of the packaging machine 1 is sufficient for processing additional products 2, or if on the packaging stations 3 upstream of the two belt conveyors 6, different products 2 or packagings 5 are to be produced.

Figure 4:
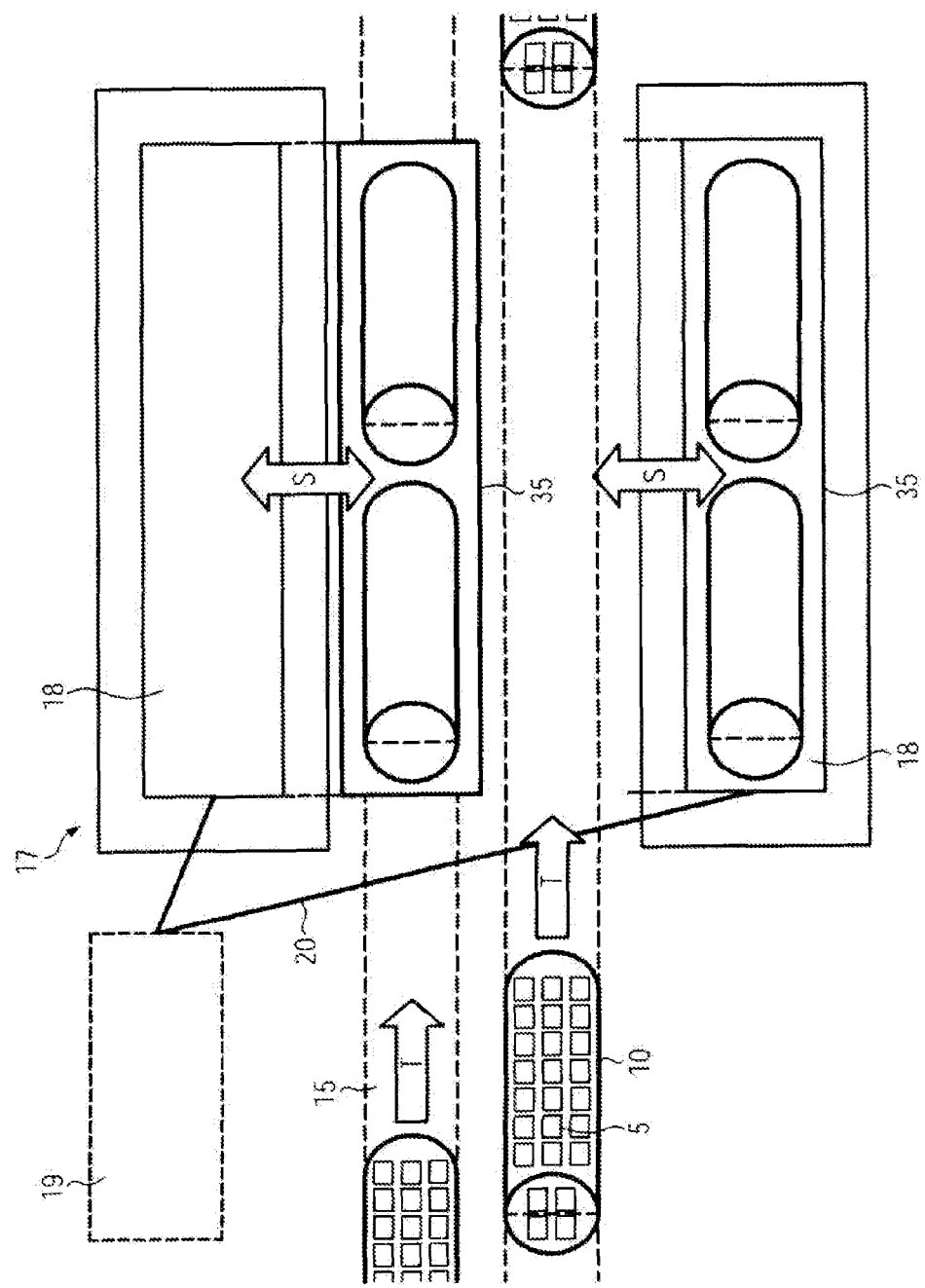
FIG. 4 shows a schematic view of the high-pressure chambers in the high-pressure treatment station.

FIG. 4 shows an enlarged detail of the high-pressure treatment station 17 of the packaging machine 1 according to the disclosure. On each of the two sides, the high-pressure station 17 has a box-shaped yoke into which a cylindrical autoclave 35 can be inserted laterally. Each of the two autoclaves 35 that can travel laterally in direction of arrow S is just large enough to be able to accommodate two transport containers 10. As soon as two transport containers 10 have been inserted into the autoclave 35 in the axial direction, the autoclave 35 is laterally shifted in the direction of arrow S and in this manner introduced into the yoke. Together with the yoke which closes the autoclave 35 on both sides, the autoclave 35 now defines the high-pressure chamber 18.

FIG. 4 already indicates that the two high-pressure chambers 18 of the high-pressure station 17 can be operated in a time-staggered manner with respect to each other even with the same cycle time. While the upper autoclave 35 is arranged outside the yoke to be loaded or unloaded, the lower autoclave 35 is located in the yoke allocated to it. Thereby, the high-pressure chamber 18 formed by the yoke and the lower autoclave 35 is closed, so that in this high-pressure chamber 18, a high-pressure treatment of the products 2 can be carried out.

As an alternative to the variant shown in FIG. 4, it is conceivable to place the high-pressure chambers 18 not laterally offset with respect to the transport means 15, but directly in the direction of transport of the transport means 15. By means of the transport means 15 or any other transport element, for example a slider, the cylindrical transport containers 10 could be driven straightly into the also cylindrical high-pressure chamber 18 or removed from the high-pressure chamber 18 after the high-pressure treatment.

Figure 5:
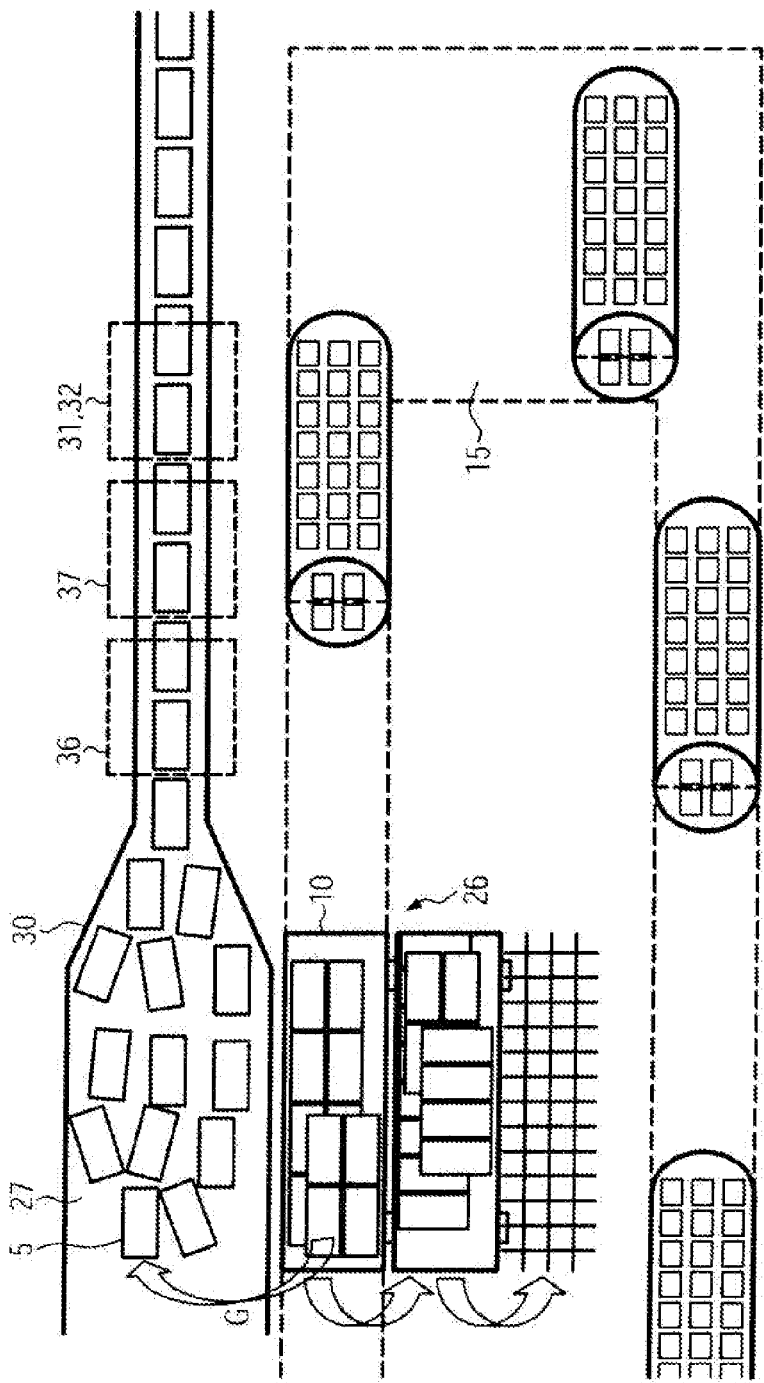
FIG. 5 shows a section of the machine shown in FIG. 1 in the region of the unloading station.

FIG. 5 shows an enlarged detail of the packaging machine 1 in the region of the unloading station 23. In the unloading station 26 or possibly already before along the transport means 15, the transport containers 10 are opened. The gripper 24 takes care of the unloading of the transport container 10 by the movement indicated by the arrow G. The unloaded packagings 5 are placed on a discharge belt 27. An isolation means 30 takes care of orienting and isolating the packagings 5.

Downstream of the isolation means 30, a plurality of further processing stations is provided: a dryer 36 for drying the packagings 5, i.e. for removing the high-pressure medium (normally water) which might still adhere to the packagings 5, a labeling and marking station 37, as well as an inspection system 31 with sorting-out means 32 to be able to identify and sort out defective or damaged products 2 or packagings 5.

Hereinafter, the operation of the packaging machine 1 according to the disclosure or the course of the method according to the disclosure will be described by means of the route of a product 2 through the packaging machine 1 with reference to an embodiment.

The product 2 is placed into the lower part of a packaging 5 on the first conveyor belt 4, for example into a deep-drawn trough in a continuous foil web, or in already isolated, preshaped trays. The conveyor belt 4 transports the product 2 into the packaging station 3. In the packaging station 3, the packaging 5 is evacuated and/or swept with a replacement gas before it is gastightly sealed and closed.

The second conveyor belt 6 transports the finished packagings 5 from the packaging station 3 to the isolation means 30 where a single track of packagings 5 is produced. Between the packaging station 3 and the isolation means 30, separation and cutting means can be provided to separate the possibly still interconnected packagings 5.

The packagings 5 isolated by means of the isolation means 30 reach the inspection system 31 where different properties of the products 2 or their packagings 5 are checked, for example weight, appearance, the nonexistence of a product or the existence of metal residues. Damaged or defective packagings 5' are identified by the inspection system 31 and withdrawn from the process via the sorting-out means 32.

The other packagings 5 reach the storage area 7. The guide means 8 take care of an orientation of the packagings 5 and of a distribution to the different compartments of the storage area 7. The oriented packagings 5 are now gripped by the gripper 24 and loaded into an opened transport container 10. To this end, the upper part 12 of the transport container 10 has been swiveled open relative to the lower part 11 about the hinge, and the holding element 14 has been swiveled open relative to the upper part 12 also in the direction P.

The storage area 7 continuously takes up products and thus makes sure that the work cycles of the high-pressure station 17 and the packaging station 3 do not necessarily have to be synchronized exactly with respect to each other. Even in case of fluctuations in the productivity of the packaging stations 3, for example during retrofitting or cleaning of the packaging station 3, sufficient products 2 can always be present in the storage area 7 to be able to "continuously" charge the high-pressure station 17.

As soon as the lower and upper part 11, 12 of the transport container 10 are filled, first the holding element 14 is swiveled back for closing the upper part 12 to secure the packagings 5 contained in the upper part 12 against getting out of place. Subsequently, the upper part 12 is swiveled about the hinge 13 onto the lower part 11, whereby the transport container 10 is closed. In the closed, cylindrical form of the transport container 10, the upper part 12 can be locked relative to the lower part 11.

Subsequently, the transport means 15 transports the transport container 10, which is closed but provided with openings for the passage of high-pressure medium, to the high-pressure station 17. One or several transport containers 10 are together introduced into the opened high-pressure chamber 18. This introduction can be accomplished by means of a slider in the axial direction of the transport means 15.

After the high-pressure chamber 18 has been filled, the high-pressure chamber 18 is flooded with high-pressure medium (usually water at room temperature). The high-pressure medium passes from the pressure generating system 19 via the pressure distribution system 20 into the respective high-pressure chamber 18. It is conceivable to deaerate the high-pressure chamber 18 until it is completely filled with high-pressure medium. It is also possible that one or several locking caps of the high-pressure chamber 18 assume a first closed position during flooding, and that they are transferred to a second, lower closed position after flooding, to thus already generate a primary pressure in the high-pressure medium.

After the high-pressure chamber 18 has been completely closed, the pressure in the high-pressure chamber 18 is increased by means of the pressure generating system 19, typically to values between 400 MPa and 1000 MPa. The high-pressure medium penetrates through the openings into the transport container 10 and sets the packagings 5 and the products 2 contained therein under high pressure. The maximum pressure of the high-pressure medium is maintained for a predetermined period before pressure is reduced again.

The packaging machine 1 is operated in cycles. The cycle of all components of the packaging machine 1, in particular the belt conveyors 4, 6, the packaging stations 3, the gripper 24, the transport means 15 and the double autoclave 17, including the pressure generating system 19, are predetermined by the central control system 28.

Figure 6:
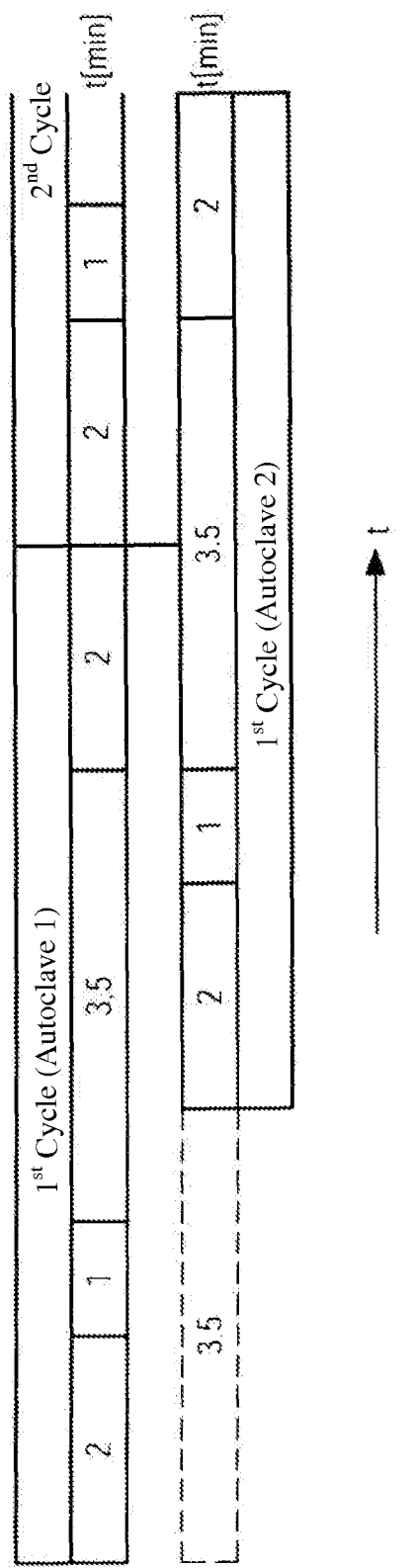
FIG. 6 shows a schematic representation of the timed operation of the two high-pressure chambers shown in FIG. 1.

FIG. 6 schematically shows a detail of the timed operational sequence of the two autoclaves or high-pressure chambers 18, respectively. At the beginning of the production shift or the like, only the first autoclave 18 operates. Over a period of two minutes, the autoclave is opened, unloaded, loaded again and closed. In the subsequent period of one minute, the first autoclave 18 is flooded with water and optionally deaerated in the process. Then, over a period of 3.5 minutes, the high pressure is built up in the high-pressure chamber 18 by means of the pressure generating system 19. The maximum pressure is maintained for another 2 minutes, optionally with the aid of the means 21 for maintaining the high pressure. At the end of this period of 2 minutes, the pressure in the high-pressure chamber 18 is again reduced to normal pressure. Thus, the first cycle of the first autoclave 18 is completed, and the second cycle starts.

The second autoclave 18 operates with the same timing, but time-staggered with respect to the first autoclave 18. The first cycle of the second autoclave 18 begins after a waiting time of 3.5 minutes relative to the first autoclave 18. It is thus ensured that the phase of the high pressure build-up in the second autoclave 18 starts at the time when the first autoclave 18 has reached the maximum pressure. In this manner, the pressure generating system 19 can run quasi in a continuous operation.

It is conceivable that means for checking and controlling the pressure reduction of the high-pressure medium are provided at each high-pressure chamber 18. For example, the high-pressure chamber can comprise a discharge valve for discharging high-pressure medium from the high-pressure chamber as well as a controllable actuator by means of which the rate of pressure reduction in the high-pressure chamber can be controlled at least over a predetermined pressure range. The rate of pressure reduction could be continuously controllable, and the actuator could comprise a pressure intensifier and be controllable, for example, by means of compressed air. In this manner, an initially very quick pressure reduction could be achieved, which is, however, clearly slowed down within a predetermined pressure range to thus avoid damages to the products 2 or their packagings 5 by a too quick pressure reduction.

As soon as the high-pressure treatment is completed, the transport containers 10 are again transported out of the high-pressure chamber 18 and brought to the unloading station 26 by means of the transport means 15. In this way, the transport containers 10 can be already opened. At the unloading station 26, a gripper 24 removes the packagings 5 and places them onto a discharge belt 27. Via an isolation means 30, the packagings are passed to a dryer 36 which removes excessive high-pressure medium. Subsequently, a labeling machine or printer 37 attaches labels and marks on the packagings 5 before the packagings 5 are passed to a further inspection system 31 with sorting-out means 32.

The packaging machine 1 shown in FIG. 1 is largely constructed (mirror-)symmetrically. One packaging station 3 and one separate cycle of a transport means 15 with a group of transport containers 10 are allocated to each of the two high-pressure chambers 18. Only the control of the complete packaging machine 1 is effected via the central control system 28, and the pressure generation in the two high-pressure chambers 18 is effected via the common pressure generating system 19. It would be possible, however, to only provide one single, common cycle of a transport means 15 for the transport containers 10 transported to both chambers 18.

Starting from the represented embodiments, the packaging machine 1 according to the disclosure and the method according to the disclosure can be modified in many ways. For example, more than two high-pressure chambers 18 could be provided. The packaging machine 1 could also employ integrally formed transport containers 10. It would also be conceivable that only one single packaging station 3 is provided, and that the packagings 5 produced by it are distributed to the transport containers 10 of the two high-pressure chambers 18. The periods of the individual process phases of the high-pressure chambers 18 shown in FIG. 6 are only given by way of example and can be adjusted otherwise. It is furthermore possible that the several autoclaves 35 are not provided in one common housing or container 17, but each in separate housings.

While embodiments of the disclosure have been illustrated and described, it is not intended that these embodiments illustrate and describe all possible forms of the disclosure. Rather, the words used in the specification are words of description rather than limitation, and it is understood that various changes may be made without departing from the spirit and scope of the disclosure.

What is claimed is:

1. A method for operating a packaging machine for packaging products in at least one automatic packaging station, said method comprising:
   packaging products in at least one automatic packaging station to provide packaged products;
   loading packaged products into transport containers;
   exposing the packaged products in the transport containers to high-pressure treatment in at least one high-pressure treatment station to provide treated packaged products;
   unloading treated packaged products from the transport containers; and
   wherein the packaged products are stored in a storage area between the automatic packaging station and the high-pressure treatment station;
   wherein the operation of the automatic packaging station and the operation of the high-pressure treatment station are coordinated by means of a common control system that is connected to the automatic packaging station and the high pressure treatment station;
   wherein the common control system is designed to adjust the number of packagings produced in the automatic packaging station per time unit to the number of packagings treated with high pressure in the high-pressure treatment stations per time unit;
   wherein the automatic packaging station and the high-pressure treatment station are operated in synchronism by means of the common control system;
   wherein the high-pressure treatment station comprises at least two high-pressure chambers in which the products can be subjected to a high-pressure medium, wherein a common pressure generating system is provided for supplying the high-pressure chambers with pressurized high-pressure medium, and wherein the high-pressure chambers are operated with different or time-staggered timing;
   wherein within one of the high-pressure chambers, the building up of high pressure begins after the building up of high pressure is completed in another high-pressure chamber;
   wherein several pressure cycles are performed consecutively in one high-pressure chamber;
   wherein before and/or after the high-pressure treatment, an automatic inspection of the products or their packagings for damages or deficiencies is accomplished; and
   wherein the loading of transport containers with packaged products and/or the unloading of the treated packaged products from the transport container is performed automatically.

2. The method of claim 1 wherein the at least one automatic packaging station comprises a packaging machine.

3. The method of claim 1 wherein the automatic packaging station is selected from the group consisting of a deep-drawing packaging station, a conveyor-belt packaging machine, a chamber conveyor-belt packaging machine and a tray-sealer.

4. The method of claim 1 wherein the transport containers comprise containers having openings for the passage of high-pressure medium.

5. The method of claim 1 wherein the automatic loading of transport containers with packaged products and/or the unloading of the treated packaged products from the transport container is performed by automated grippers that are connected with, and controlled by, the common control system.

6. A method for operating a packaging machine for packaging products in at least one automatic packaging station, said method comprising:
   packaging products in at least one automatic packaging station; and
   exposing the packaged products to high-pressure treatment in at least one high-pressure treatment station;
   wherein the operation of the automatic packaging station and the operation of the high-pressure treatment station are coordinated and operated in synchronism by means of a common control system; and
   wherein the high-pressure treatment station comprises at least two high-pressure chambers in which the products can be subjected to a high-pressure medium, and a common pressure generating system is provided for supplying the high-pressure chambers with pressurized high-pressure medium.

7. The method of claim 6 wherein the at least one automatic packaging station comprises several automatic packaging stations and the at least one high-pressure treatment station comprises one single high-pressure treatment station.

8. The method of claim 6 wherein the pressure generating system comprises an actuated pressure distribution system by means of which the pressure can be selectively applied to one of the high-pressure chambers.

9. The method of claim 6 wherein the high-pressure treatment station includes a high-pressure chamber capable of exposing products contained in the packagings to a pressure between 400 MPa and 1000 MPa.

10. The method of claim 6 wherein the high-pressure treatment station comprises a sealable high-pressure chamber, at least one pressure pump, and a high-pressure medium.

11. The method of claim 6 wherein the high-pressure chambers are operated with different or time-staggered timing.

12. A packaging machine for packaging products, said packaging machine comprising:
    at least one automatic packaging station for producing packagings that accommodate products;
    at least one high-pressure treatment station for high-pressure treatment of the products contained in the packagings; and
    a central control system in communication with, and for controlling, the automatic packaging station and the high-pressure treatment station;
    wherein the high pressure treatment comprises at least two high-pressure chambers in which products can be subjected to a high-pressure medium alternatingly and/or simultaneously; and
    further comprising a common pressure generating system for supplying the high-pressure chambers with pressurized high-pressure medium.

13. The packaging machine according to claim 12 wherein the at least one automatic packaging station comprises several automatic packaging stations and at least one high-pressure treatment station comprises one single high-pressure treatment station.

14. The packaging machine according to claim 12 further comprising at least one transport container for accommodating products during the high-pressure treatment of the products, wherein the transport container comprises a lower part and an upper part which can be connected to each other, wherein the lower part as well as the upper part are embodied to accommodate at least one product.

15. The packaging machine according to claim 14 further comprising means for automatically opening and/or closing the transport containers, the means for automatically opening and/or closing the transport containers comprising mechanical and/or pneumatic means.

16. The packaging machine according to claim 14 further comprising a transport means for transporting the transport containers from a loading station to the high-pressure chambers, further to an unloading station and back to the loading station, and a gripper for loading or unloading the transport containers at the loading station and/or at the unloading station.

17. The packaging machine according to claim 16 further comprising a storage area for storing a plurality of products between the automatic packaging station and the high-pressure treatment station, and an automatic inspection system for examining the products and/or their packagings, wherein at least one of the transport means, the gripper, and the inspection system are connected to, and controlled by, the central control system.

18. The packaging machine according to claim 12 wherein the pressure generating system comprises an actuated pressure distribution system by means of which the pressure can be selectively applied to one of the high-pressure chambers.

19. The packaging machine according to claim 18 wherein the pressure generating system can apply different pressures simultaneously to the two high-pressure chambers.

20. The packaging machine according to claim 19 wherein the pressure generating system comprises means for maintaining high pressure in the high-pressure chambers.

21. The packaging machine of claim 12 wherein the high-pressure chambers are capable of exposing products contained in the packagings to a pressure between 400 MPa and 1000 MPa.

22. The packaging machine of claim 12 wherein the high-pressure chambers are capable of exposing products contained in the packagings to a pressure between 400 MPa and 1000 MPa, and wherein the high-pressure treatment station comprises at least one pressure pump and a high-pressure medium, and wherein the high-pressure chambers each comprise a sealable high pressure chamber.

23. The packaging machine of claim 22 wherein the high-pressure medium comprises water.

24. The packaging machine of claim 12 wherein the temperature in the high-pressure chambers is at ambient temperature.

* * * * *